United States Patent Office 3,803,211
Patented Apr. 9, 1974

3,803,211
NOVEL p-AMINOBENZOATES
Ladislav Dolejš, 56 Letohradska; Pavel Beran, 7 Nar. Obrany; Jitka Kahovcová, 3 ul. P. Rezka; Zuzana Machová, 7 Mezibranska; Karel Sláma, 674 Na cervenem vrchu; and František Sorm, 9 Korejska, all of Prague, Czechoslovakia
No Drawing. Filed Dec. 14, 1970, Ser. No. 98,093
Claims priority, application Czechoslovakia, Dec. 23, 1969, 8,513/69
Int. Cl. C07c *101/60*
U.S. Cl. 260—471 R         9 Claims

ABSTRACT OF THE DISCLOSURE

Novel N-substituted anilines of Formula I useful for the control of insects.

---

This invention relates to a process of preparing novel compounds for the control of insects and to the novel compounds of Formula I:

$$R_2\text{-}N(R_1)\text{-}C_6H_3(Y)\text{-}X \quad (I)$$

wherein,
X is $$-\overset{O}{\underset{\|}{C}}-OR^3 \text{ or } -\overset{O}{\underset{\|}{C}}-R^3$$

in which $R^3$ is hydrogen, lower alkyl, aryl or aralkyl;
Y is hydrogen, or together with X, forms a methylenedioxy bridge;
$R^1$ is one of the groups A, B or C:

$$R^6-\underset{\underset{Z^4}{|}}{\overset{\overset{R^5}{|}}{C}}-CH-(CH_2)_2-\underset{\underset{Z^2}{|}}{\overset{\overset{R^4}{|}}{C}}-CH-(CH_2)_2-\underset{\underset{Z'}{|}}{\overset{\overset{R}{|}}{C}}-CH-CH_2- \quad (A)$$

$$R^6-\underset{\underset{Z^4}{|}}{\overset{\overset{R^5}{|}}{C}}-CH-(CH_2)_n-\underset{\underset{Z^2}{|}}{\overset{\overset{R^4}{|}}{C}}-CH-(CH_2)_m- \quad (B)$$

$$R^6-\underset{\underset{Z^4}{|}}{\overset{\overset{R^5}{|}}{C}}-CH-(CH_2)_n-CH- \quad (C)$$

in which each of R, $R^4$, $R^5$ and $R^6$ is hydrogen or lower alkyl; Z is hydrogen and Z' is hydrogen, or together with Z, a carbon-carbon bond; $Z^1$ is hydrogen and $Z^2$ is hydrogen, or together with $Z^1$, a carbon-carbon bond; $Z^3$ is hydrogen and $Z^4$ is hydrogen, or together with $Z^3$, a carbon-carbon bond;
$R^2$ is hydrogen, methyl, ethyl, propyl, n-butyl or one of the groups A, B or C;
m is the positive integer one or two; and
n is the positive integer two or three.

The term "aryl," as used herein, refers to an aryl group of six to twelve carbon atoms, such as phenyl, naphthyl and methylphenyl.

The term "lower alkyl," as used herein, refers to an alkyl group, straight or branched, having a chain length of one to six carbon atoms. The term "aralkyl," as used herein, refers to aralkyl of seven to twelve carbon atoms, such as benzyl, phenethyl, methylbenzyl and naphthylmethyl.

The novel compounds of Formula I is useful for the control of insects. The utility of these compounds as insect control agents is believed to be attributable to their juvenile hormone activity. They are preferably applied to the immature insect, namely—during the embryo, larvae or pupae stage in view of their ability to inhibit metamorphosis and otherwise cause abnormal development. These compounds are effective control agents for Hemipteran, such as Lygaeidae, Miridae and Pyrrhocoridae; Coleopteran, such as Tenebrionidae; Lepidoptern, such as Pyralidae, Noctiidae and Gelechiidae; Dipteran, such as mosquitoes; Orthoptera such as roaches; and Homoptera, such as aphids. The compounds can be applied at low dosage leveles of the order of 0.001 μg. to 25 μg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 50% of the active compound is employed. The formulation can include insect attractants, emulsifying agents and wetting agents to assist in the application and efficiency of the active ingredient.

In the description following, each of X, Y, R to $R^6$, Z to $Z^4$, m and n are as defined above.

The compounds of Formula I are prepared, preferably in an organic solvent inert to the reaction, by reacting an aniline of Formula II:

$$H\text{-}N(R^2)\text{-}C_6H_3(Y)\text{-}X \quad (II)$$

with an alkylating agent $R^1$-Z in which Z is bromo or chloro.

The halide $R^1$-Z in which $R^1$ is the group B or C can be prepared from the corresponding C-1 alcohol which is obtained by reduction of an acid or ester of the formula:

$$R^6-\underset{|}{\overset{\overset{R^5}{|}}{C}}=CH-(CH_2)_n-\underset{|}{\overset{\overset{R^4}{|}}{C}}=CH-(CH_2)_m-COOR_5 \quad (V)$$

in which $R^5$ is hydrogen or lower alkyl, using lithium aluminum hydride, or the like. The overall synthesis can be outlined as follows:

$$\begin{array}{ccc}
R^6-\overset{R^5}{\underset{|}{C}}=O & \xrightarrow{\text{Wittig}} & R^6-\overset{R^5}{\underset{|}{C}}=CH-(CH_2)_n-\overset{R^4}{\underset{|}{C}}=O \\
(III) & & (IV)
\end{array}$$

$$(V) \qquad R^6-\overset{R^5}{\underset{|}{C}}=CH-(CH_2)_n-\overset{R^4}{\underset{|}{C}}H-OH$$
$$(IV')$$

$$R^6-\overset{R^5}{\underset{|}{C}}=CH-(CH_2)_n-\overset{R^4}{\underset{|}{C}}=CH-(CH_2)_m-OH$$
$$(VI)$$

In the practice of the above process, a dialkyl ketone of Formula III is reacted with a Wittig reagent of Formula III' (φ is phenyl):

$$\phi_3P=CH-(CH_2)_n-\underset{O\diagdown\diagup O}{\overset{|}{C}}-R \quad (III')$$

to form the ethylene ketal of a compound of Formula IV which is hydrolyzed by treatment with acid to the ketone (IV). The ketone (IV) is then reacted with the carbanion of dialkyl carbalkoxyphosphonate to yield the α,β-unsaturated ester (V; m is zero and $R^5$ is lower alkyl) or with β-carboxyethyltriphenylphosphonium chloride in the presence of base to yield β,γ-unsaturated acid (V; m is one and R[5] is hydrogen). Suitable conditions are described by H. S. Corey et al., J. Am. Chem. Soc. 86, 1884–1885 (1964), the disclosure of which is incorporated by reference. The acid or ester (V) is then reduced by conventional techniques using lithium aluminum hydride or like reducing agent to yield the primary alcohol (VI) which is converted to the C–1 bromide or chloride using phosphorus trichloride, phosphorus tribromide, phosphorus pentachloride, phosphorus pentabromide, or the like. The halide alkylating agents can be prepared also using the synthesis of Bowers, Science 164, 323–325 (1969) which is incorporated by reference. The compounds of Formula IV' are prepared by reduction of the ketone (IV) using sodium borohydride, lithium aluminum hydride, or the like, and the conversion of the secondary alcohol into the bromide or chloride using phosphorus tribromide or phosphorus trichloride. Hydrogenation using palladium or other catalyst yields the saturated and mono-saturated alkylating agents.

The following examples are provided to illustrate the practice of the present invention and the preparation of the novel compounds. Temperature is given in degrees centigrade.

EXAMPLE 1

3,4-methylenedioxyaniline (2 g.) is dissolved in dimethylformamide (10 ml.) and the solution is treated with geranyl bromide (4 g.) and anhydrous potassium carbonate (2.6 g.). The reaction mixture is heated at 70° C. for 12 hours, diluted with water and extracted with ether. The ethereal layer is dried over anhydrous sodium sulfate, evaporated and the residue fractionated under diminished pressure to yield N-geranyl 3,4-methylenedioxyaniline.

By use of the above procedure, 3,4-methylenedioxyaniline is alkylated using 3,7-dimethyloct-6-enyl bromide, 1,5-dimethylhex-4-enyl bromide, 3,7 - dimethylnona-2,6-dienyl bromide, 3-ethyl-7-methylnona-2,6-dienyl bromide and 4,8-dimethylnona-3,7-dienyl bromide to yield the anilines under Column I:

I

N-3,7-dimethyloct-6-enyl 3,4-methylenedioxyaniline,
N-1,5-dimethylhex-4-enyl 3,4-methylenedioxyaniline,
N-3,7-dimethylnona-2,6-dienyl 3,4-methylenedioxyaniline,
N-3-ethyl-7-methylnona-2,6-dienyl 3,4-methylenedioxyaniline,
N-4,8-dimethylnona-3,7-dienyl 3,4-methylenedioxyaniline.

EXAMPLE 2

A 50% suspension of sodium hydride in mineral oil (0.5 g.) is mixed under nitrogen with purified dioxane (15 ml.) and ethyl p-aminobenzoate (1.65 g.) in dioxane (10 ml.) is added. The whole mixture is refluxed for two hours, treated with a solution of geranyl bromide (2.45 g.) in dioxane (15 ml.) and the reflux continued under nitrogen for another two and one-half hours. The reaction mixture is cooled, filtered and the filtrate evaporated under diminished pressure to remove dioxane. The residue is shaken with a mixture of water and ether, the ethereal layer is washed with 5% aqueous hydrochloric acid, dried over anhydrous sodium sulfate and evaporated. The residue is purified by column chromatography on silica gel to yield ethyl N-geranyl-p-aminobenzoate.

Each of the bromides listed in Example 1 is used as the alkylating agent in the process of Example 2 to yield the ethyl p-aminobenzoates under Column II:

II ethyl N-3,7-dimethyloct-6-enyl-p-aminobenzoate,
ethyl N-1,5-dimethylhex-4-enyl-p-aminobenzoate,
ethyl N-3,7-dimethylnona-2,6-dienyl-p-aminobenzoate,
ethyl N-3-ethyl-7-methylnona-2,6-dienyl-p-aminobenzoate,
ethyl N-4,8-dimethylnona-3,7-dienyl-p-aminobenzoate.

EXAMPLE 3

The process of Example 2 is repeated using methyl p-aminobenzoate to yield methyl N-geranyl-p-aminobenzoate and methyl N-3,7-dimethyloct-6-enyl-p-aminobenzoate. Other methyl N-substituted p-aminobenzoates are prepared using an alkylating agent of the formula R[1]-Z following the procedure of Example 2.

EXAMPLE 4

Methyl p-aminophenylketone is alkylated using geranyl bromide and citronellyl bromide following the procedure of Example 2 to yield methyl N-geranyl p-aminophenylketone and methyl N-citronellyl p-aminophenylketone. Similarly, using farnesyl bromide as the alkylating agent, there is obtained methyl N-farnesyl p-aminophenylketone.

Ethyl p-aminophenylketone is alkylated using the procedure of Example 2 to yield the corresponding compounds of Formula I.

Each of the methyl N-geranyl p-aminobenzoate, methyl N-citronellyl p-aminobenzoate and N-geranyl 3,4-methylenedioxy-aniline were tested topically on 5th instar larvae of Triatoma infestans and found to have an ID$_{50}$ of 0.5, 0.1 and 0.1 micrograms. The method of testing is described by Sláma, Romanuk and Šorum, The Biological Bulletin 136, 91–95 (1969).

What is claimed is:

1. A compound selected from those of the following formula:

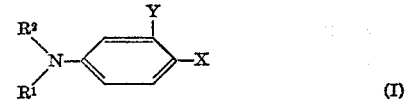
(I)

wherein, X is

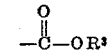

in which R[3] is lower alkyl,
Y is hydrogen,
R[1] is one of the groups A, B or C:

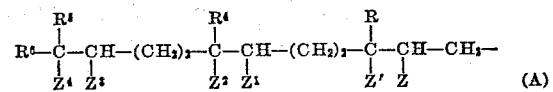
(A)

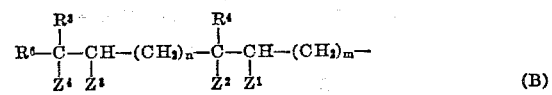
(B)

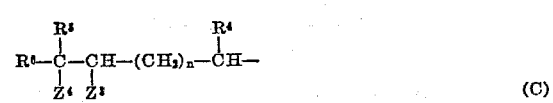
(C)

in which each of R, R[4], R[5] and R[6] is hydrogen or lower alkyl; Z is hydrogen and Z' is hydrogen or together with Z, a carbon-carbon bond; Z[1] is hydrogen and Z[2] is hydrogen, or together with Z[1], a carbon-carbon bond; Z[3] is hydrogen and Z[4] is hydrogen, or together with Z[3], a carbon-carbon bond;

R[2] is hydrogen, methyl, ethyl, propyl, n-butyl or one of the groups A, B or C;
m is the positive integer one or two; and
n is the positive integer two or three.

2. A compound according to claim 1 wherein R[1] is the group:

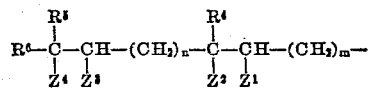

3. A compound according to claim 2 wherein m is one and n is two.

4. A compound according to claim 3 wherein R[3] is methyl or ethyl; each of R[4], R[5] and R[6] is methyl or ethyl and R[2] is hydrogen.

5. A compound according to claim 4 wherein $R^4$ is methyl and $Z^4$ taken with $Z^3$ is carbon-carbon bond.

6. A compound according to claim 5 wherein $R^5$ is methyl.

7. A compound according to claim 5 wherein each of $R^5$ and $R^6$ is methyl.

8. A compound according to claim 1 selected from the formula:

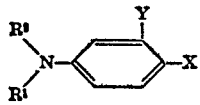

wherein X is

and $R^3$ is lower alkyl,
Y is hydrogen, and

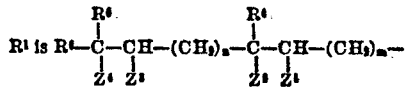

in which each of $R^4$, $R^5$ and $R^6$ is hydrogen or lower alkyl;

$Z^1$ is hydrogen and $Z^2$ is hydrogen, or together with $Z^1$ a carbon-carbon bond;

$Z^3$ is hydrogen and $Z^4$ is hydrogen, or together with $Z^3$ a carbon-carbon bond;

$R^2$ is hydrogen, methyl, ethyl, propyl, n-butyl or $R^1$;

$m$ is the positive integer one or two; and $n$ is the positive integer two or three.

9. A compound according to claim 1 which is ethyl-N-geranyl-p-aminobenzoate.

References Cited
UNITED STATES PATENTS 3,671,558   6/1972   Siddall et al. ----- 260—471 R LORRAINE A. WEINBERGER, Primary Examiner L. A. THAXTON, Assistant Examiner U.S. Cl. X.R.

260—340.5, 518 R, 577; 424—282, 310, 319, 330